Figure 1:
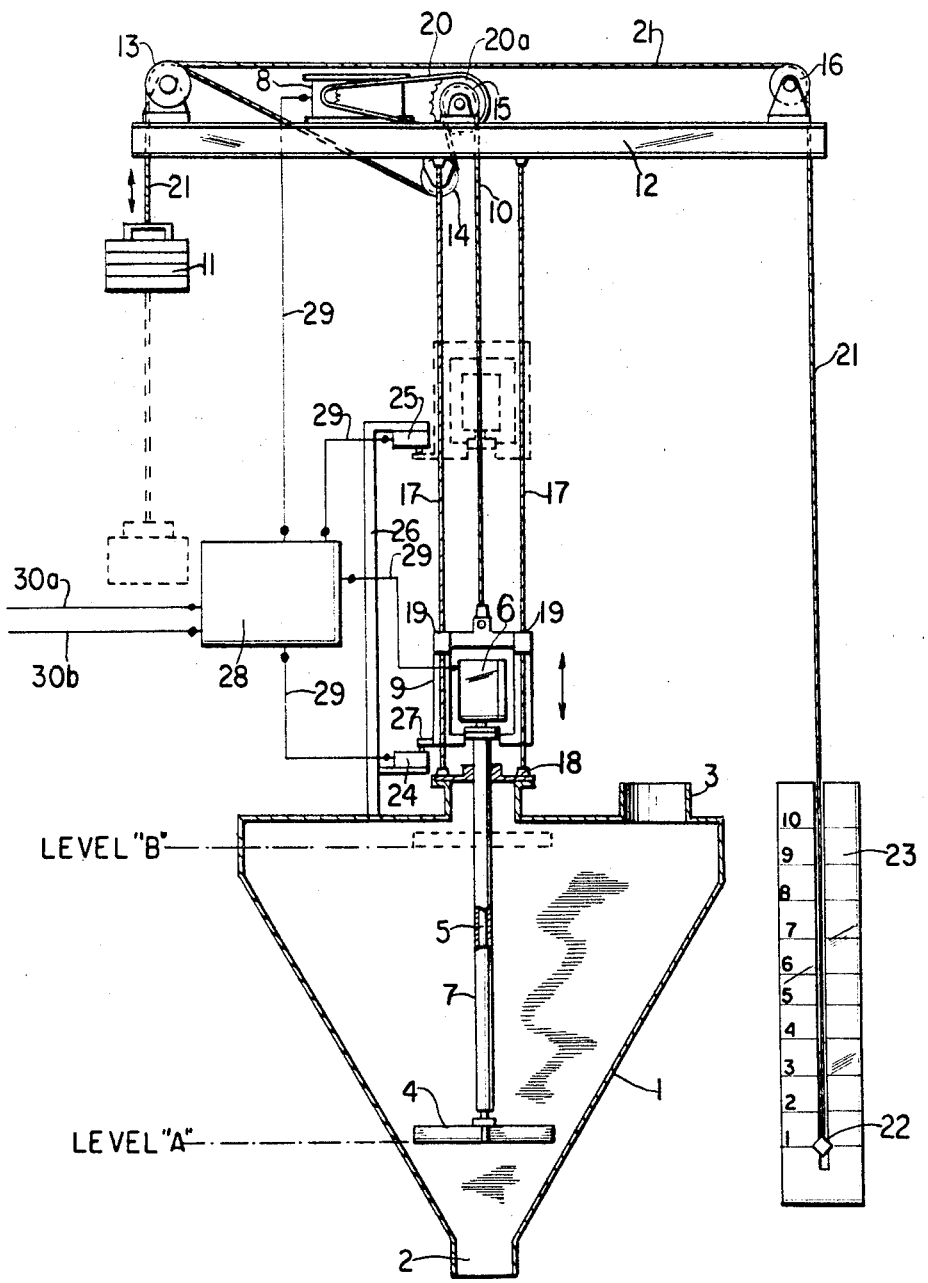

Sept. 10, 1968  D. F. POBST, JR  3,400,462
MATERIAL LEVEL DETECTOR
Filed Oct. 22, 1965  2 Sheets-Sheet 1

INVENTOR
DAVID F. POBST, JR
BY
ATTORNEY

United States Patent Office 3,400,462
Patented Sept. 10, 1968

3,400,462
MATERIAL LEVEL DETECTOR
David F. Pobst, Jr., Pampa, Tex., assignor to Columbian Carbon Company, New York, N.Y., a corporation of Delaware
Filed Oct. 22, 1965, Ser. No. 501,521
4 Claims. (Cl. 33—126.6)

This invention relates to automatically operating apparatus for continuously detecting the level of a freely flowing material contained within a tank.

In tanks containing readily flowing materials such as liquids or finely-divided solids, the level to which the tank is filled may fluctuate considerably when filling and discharging operations occur at different times or at different rates. In many instances, it is desirable to know the precise level or amount of material residing within the tank at any given time.

Torque responsive material detectors have been devised which comprise a torque actuated current controlling means that electrically activates a signal means when a rotating member of the detector is engaged or disengaged with material contained within a tank. However, such detectors are constructed and employed in such a manner that the rotating member remains in a fixed location. It is, therefore, not possible to detect material levels occurring outside the engagement limits of the rotating member, and most significantly, it is not possible to continuously detect the precise level of the material as it fluctuates wtih pre-established limits of measurement.

Accordingly, it is one object of the present invention to provide improved apparatus for detecting the level or amount of freely flowing material residing within a tank or similar containing vessel.

It is another object of the invention to provide automatically operating apparatus that continuously determines and indicates the level of freely flowing material contained within a tank.

Still another object is to provide apparatus for continuously gauging the precise level of material residing within pre-established limits within a tank.

Various other objects and advantages of the invention will be apparent from the following detailed description thereof.

Briefly, the apparatus provided by the present invention includes a rotating material contacting member, sometimes referred to herein for simplicity as a "contactor." A torque force is generated when rotation of the contactor is impaired or arrested by contact with the freely flowing material contained in the tank. The torque force generated upon such rotation-resistive engagement of the contactor with the material actuates a current controlling means, usually a mechanically operated switch, which in turn actuates electrically-operated drive means to move the contactor in an upwardly direction inside the tank. When out of engagement with the material, the contactor is automatically lowered within the tank until engagement is established and the contactor is then automatically raised, as previously described.

Thus, the apparatus provided by the invention enables continuous and substantially precise determination of a varying level of material contained within a tank. In operation, the material contactor is lowered within the tank until it engages material. Once the engagement is made, downward movement is stopped and the contactor is then raised until engagement with the material is broken. The cycle then repeats itself and the effect is one of repeated automatic lowering, stopping and raising of the contactor so that it is continuously "hunting" the material level in the tank.

Although not essential to the invention, timing means may be included to momentarily delay raising or lowering of the contactor after engagement or disengagement thereof with the material. Such time delay means can be employed to advantage when the change in material level is relatively slow, since unnecessarily rapid, alternately up and down movement of the contactor is thereby prevented. Suitable time delay means are well-known and readily available and may include conjunctive means for regulating the time delay interval.

Means may also be provided in accordance with the invention for stopping upward or downward movement of the contactor at pre-established upper and lower limits of motion, thus creating a range of travel through which the contactor moves vertically. Means responsive to the raising and lowering of the contactor may also be included for visibly indicating the level of material within the tank. The visible indicating means may show only the material level or it may show the amount of material residing in the tank in terms of cubic feet, gallons, or any other units convenient to the gauging thereof.

The invention will be further described with reference to the drawings which represent a specific embodiment thereof, but it will be understood the invention is not limited to the embodiment shown since others will because apparent from this description and the appended claims.

Figure 2:
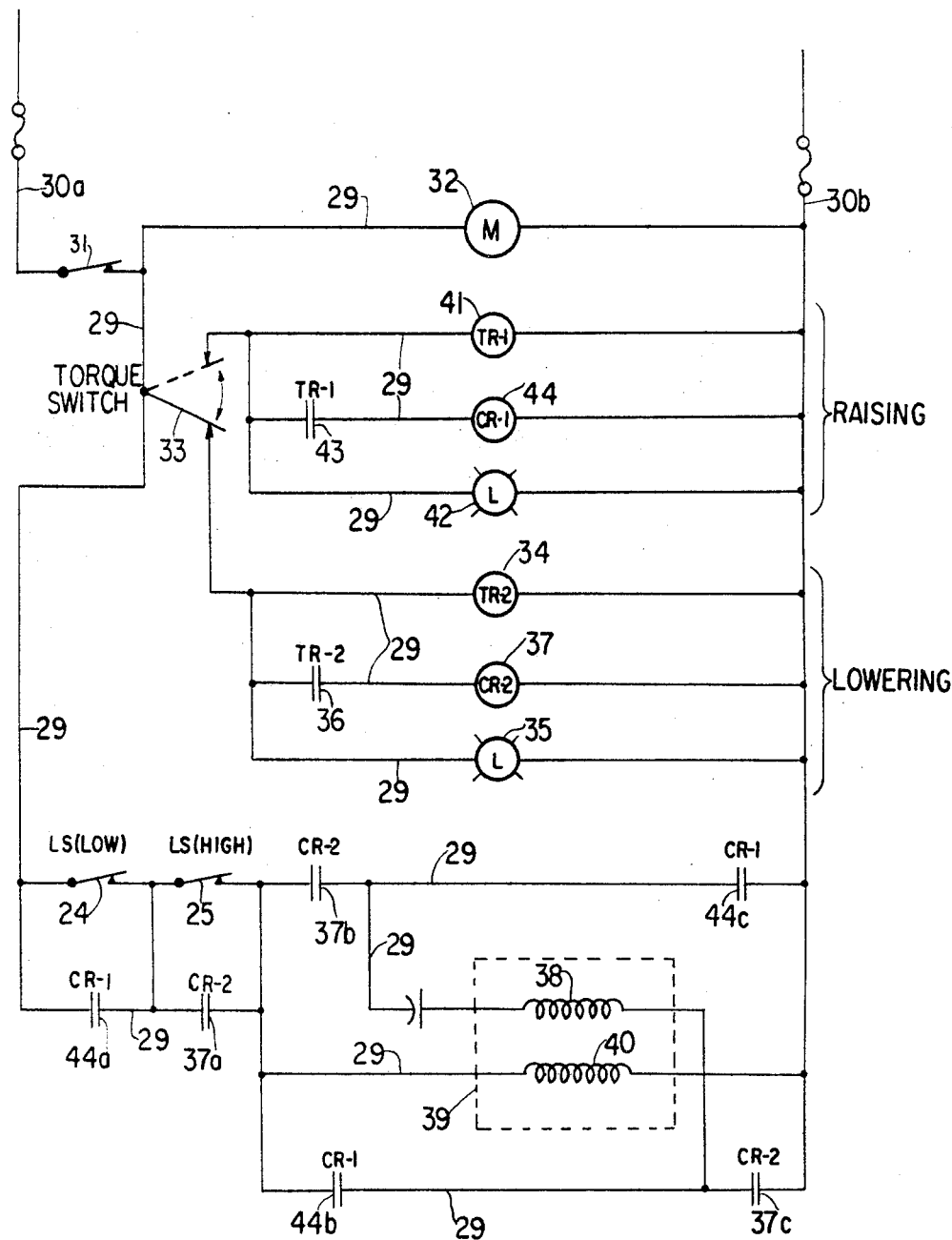

FIGURE 1 is an apparatus arrangement which may be employed in carrying out the invention, and FIGURE 2 is a diagram of circuitry which may be used in conjunction with the apparatus of FIGURE 1.

In FIGURE 1, tank 1 holds a readily flowing material such as a pulverulent solid or a liquid. The material level fluctuates within the tank because removal and filling operations through outlet 2 and inlet 3 occur at different rates or intervals. A paddle wheel 4, which is employed as the material contactor, is driven by a rotatable shaft 5 attached to a motor, not shown, contained within housing 6. The shaft has a housing 7 and an internal shaft bearing arrangement, not shown. Included with the motor in housing 6 is a torque actuated switch, not shown, to which electric current is conducted to energize a reversible motor, not shown, that motivates gear drive 8. The torque actuated switch is of the single pole, double throw (SPDT) variety whereby current flow to the motor of gear drive 8 is reversed by alternating the throw of the switch. For instance, the switch may be actuated to one relation of throw by spring tension when shaft 5 is rotating freely, i.e. when paddle wheel 4 is not in engagement with the readily flowing material, and to its other relation of throw by torque when the paddle wheel engages the material. Many suitable arrangements are known in the prior art for actuating a switch to one relation of throw by torque and to its other relation of throw by spring tension. For example, as described in U.S. Patent 2,851,-553 to N. L. Grostick, the motor casing may be provided with a radially outwardly projecting arm adapted to overcome the action of the spring of a microswitch upon generation of torque caused by engagement of the contactor with the material, and thereby actuate the switch.

The assembly comprising the housing 6, with motor and SPDT switch therein, shaft housing 7, shaft 5 and paddle 4 forms a material detector unit having a support hanger 9. The material detector unit is suspended with a cable 10 connected at one end to the support hanger and at the other end to a counterweight 11. Located well above the tank 1, superstructure 12 supports the gear drive 8 and cable pulleys 13, 14, 15 and 16. A pair of tightly drawn cables 17 extends between the superstructure 12 and tank closure member 18 and passes through guides 19 on support hanger 9 to prevent free rotation of the entire detector unit when the motor in housing 6 is energized.

The gear drive 8 is equipped with a driving chain 20 which rotates sprocket 20a attached to the same shaft as pulley 15. Pulley 15 is in fact a drive pulley for cable 10, the detector unit being raised and lowered therewith. Cable 21 is not directly driven, but moves freely as cable 10 is driven, one end of cable 21 being attached to the counterweight 11 and the other end to an indicator 22. The indicator is conjunctive with a scale 23 so that the level of material in the tank may be visibly indicated and read-out.

At pre-established upper and lower limits of travel for the detector unit, are normally closed limit switches 24 and 25 which interrupt the current supply to the motor of gear drive 8 whenever either limit of travel is reached. The limit switches are attached to a mounting frame 26 and are operated by an actuator member 27 attached to the support hanger 9. Circuitry for controlling the automatic raising and lowering of the detector unit is generally represented at 28 and will be more fully described in reference to FIGURE 2, as will the affiliated control conductors generally represented by 29, and the power supply conductors 30a and 30b.

In operation, limit switches 24 and 25, which serve to deactivate the motor of gear drive 8 when either switch is operated, are spaced apart vertically to provide a preselected range of travel for paddle 4. Level A is established as a minimum material level to be measured and level B as the maximum level. The paddle 4 thus travels up and down between levels A and B by raising and lowering the detector unit by means of the gear drive 8 and cable 10.

Paddle 4 turns freely when not in engagement with the material contained in the tank, but its blades have sufficient area to arrest rotation of the shaft 5 when material is engaged. When the paddle is out of contact with the material and rotates freely, one side of the torque actuated SPDT switch contained in housing 6 is closed by spring tension and results in the actuation of a time delay means within the circuitry represented at 28. After the elapse of a pre-established time period, the gear drive 8 is motivated in a direction which results in the lowering of the detector unit. When paddle 4 contacts material, the motor contained in housing 6 stalls and the SPDT switch is actuated by torque to the opposite relation of throw. Another time delay means is then actuated and after elapse of a predetermined interval of time, the gear drive 8 is motivated in a direction which results in raising of the detector unit until the paddle 4 is again out of contact with the material. The SPDT switch is then actuated by spring tension to the relation of throw which results in lowering of the detector unit and the cycle repeats itself automatically.

If the material contained within the tank drops below level A, limit switch 24 is actuated and the motor of gear drive 8 is deactivated until the level of material returns to level A or higher. If the level of material goes above level B, the motor of gear drive 8 is deactivated until the material level returns to or falls below B. Otherwise, the detector unit continuously and automatically "hunts" for material levels between A and B in the manner previously described.

One end of cable 21 is attached to the counterweight 11 and is raised and lowered countercurrently through the same distance as the detector unit. The indicator 22 on the other end of the cable travels up and down concurrently with the detector and also travels through the same distance. The indicator 23 may thus be arranged to represent the precise elevation of paddle 4 within tank 1 at any time and it will therefore indicate any material level residing within the pre-established lower and upper levels, A and B.

A circuit arrangement which may be employed with the apparatus previously described is shown in FIGURE 2.

Electric current is fed into the circuit through conductor 30a and passes to ground conductor 30b through the various control conductors 29. Continuity between conductors 30a and 30b is established by closing switch 31. The paddle motor contained in housing 6 is represented by 32 and runs as long as switch 31 is closed. The torque actuated single pole, double throw switch contained in housing 6 is represented at 33. When the paddle 4 is out of engagement with material contained in the tank, switch 33 is closed in the relation shown by the solid line, timing relay 34 is energized and indicating lamp 35 (green) lights to indicate that the detector unit has commenced a lowering sequence. After elapse of a time interval set into timing relay 34, contacts 36 close to actuate a control relay 37 so that conjunctive contacts 37a, 37b and 37c are closed. Continuity is thus provided to the starting and running winding 38 of the reversible motor 39 of the gear drive 8. The motor 39 is started in a direction that motivates gear drive 8 to lower the detector unit. Continuity through the running winding 40 of the reversible motor 39 exists as long as switch 31 and high and low level limit switches, represented at 25 and 24 respectively, are all closed. When the detector unit has been lowered to a point where the paddle 4 engages material, paddle motor 32 stalls and switch 33 is actuated to the relation of throw indicated by the broken lines. Timing relay 34 and control relay 37 are de-energized, contacts 36, 37a, 37b and 37c open and motor 39 stops. Simultaneously, timing relay 41 is energized and lamp 42 (red) lights to indicate that the detector unit has commenced a raising sequence. After elapse of a time interval set into timing relay 41, contacts 43 close to activate control relay 44 so that conjunctive contacts 44a, 44b and 44c are closed to energize the starting winding 38 of the reversible motor 39 of gear drive 8. Note in this case, however, that the starting winding is pulsed in an opposite direction than in the lowering sequence so that the motor 39 starts and runs in the opposite direction and thus motivates gear drive 8 to raise the detector unit.

Should the material level within the tank be below level A, limit switch 24 is actuated and its contacts opened. Continuity is interrupted to both the running winding 40 and the start and running winding 38 so that the reversible motor 39 stops and further downward travel of the detector unit is prevented although switch 33 is in the relation of throw shown by solid lines. When the level of material within the tank again rises to level A or higher, the paddle 4 engages the material, motor 32 stalls, and switch 33 is torque actuated to the relation of throw shown by the broken lines. Although limit switch 24 remains open, continuity is established to both windings of motor 39 since limit switch 25 and contacts 44a, 44b, and 44c are closed. In this case reversible motor 39 runs in a direction that motivates gear drive 8 to raise the detector unit. Continuity through switch 24 is re-established as soon as the actuator 27 is removed therefrom and the automatic "hunting" operating starts once again.

When the material within the tank is above level B, limit switch 25 is actuated and its contacts open. The reversible motor 39 of gear drive 8 then stops since continuity to both windings is broken. Once the level of material falls below level B, switch 33 is spring actuated to the relation of throw shown by the solid lines and the windings of motor 39 are energized through limit switch 24 and contacts 37a, 37b and 37c. In this case, the motor 39 runs in a direction that motivates gear drive 8 to lower the detector unit, and the automatic "hunting" operation resumes as soon as limit switch 25 is closed by removal of the actuator 27.

There is particular advantage in constructing the detector unit as shown in FIGURE 1 so that all affiliated electric circuitry and apparatus reside outside the confines of the tank, since they are thus isolated from extreme temperatures, dust, moisture, corrosives or explosive gases, as may be inherent in the materials stored inside the tank.

The material detector may comprise any suitable torque responsive-current controlling means actuated by interruptive engagement of a rotating contactor with the material. In addition to a paddle wheel, the contactor may be a disc or spindle with adequate surface area to generate sufficient torque to actuate the current-controlling means.

A material level indicator as described in reference to FIGURES 1 and 2 has been constructed using as the detector unit a commercially available detector unit having a paddle wheel as a material contactor and a SPDT switch actuated to one relation of throw by spring tension and to the other relation of throw by sufficient torque to overcome the tension of the spring. To make this commercial detector unit more adaptable for the purposes of the invention, the shaft 5 was elongated to provide sufficient insertion and range of vertical travel inside the tank and the paddle 4 was modified to provide greater surface area for positive engagement with material. Using this modified detector unit in conjunction with the means for raising and lowering the unit as provided by the present invention, it was possible to determine the level of flocculent carbon black (bulk density of 2–3 lbs./cu. ft.) contained within a dense tank with an accuracy of ±¼ inch within an 8 foot pre-established range of vertical travel.

Other means, such as a winch, may be substituted for the gear drive when practicing the invention, and other devices such as photoelectric or photoconductive cells may be used instead of limit switches 24 and 25 where preferable and practical. It is also inessential that the drive comprise a reversible motor or that torque switches of a double throw variety be employed. The drive may be provided with a motor that runs in one direction only, and by means of a slip clutch on the drive or suitable counterweighting, the contactor may be automatically lowered, upon de-energizing the drive motor, by utilizing the force of gravity. In such a case, the torque switch may be of the single throw variety, the motor being energized upon closing the switch with the torque force and de-energized when the switch opens in absence of the torque force.

While the level indicating means described herein has been used to particular advantage, other mechanical arrangements or even electrical indicators or recorders may be adapted to the purpose. Various other changes may be made in the embodiments which have been referred to above to describe the invention without departing from the spirit and scope of the invention as expressed in the appended claims.

Therefore, I claim:

1. Apparatus for detecting the level of material residing within pre-established limits within a tank comprising:
    (a) a rotating material contactor adapted to move up and down within the tank,
    (b) a reversible, electrically energized drive means which raises said material contactor within the tank when the drive means is energized in one direction and which lowers the material contactor within the tank when energized in the reverse direction,
    (c) a double-throw switch which is actuated to a first relation of throw by a torque force created upon engagement of said rotating contactor with material in the tank and which is actuated by spring tension to a second relation of throw upon disengagement of said contactor with material in the tank,
    (d) means for supplying energizing current to the electrically operated drive means through the double-throw switch, said driver means being energized in a direction with raises said material contactor when the double-throw switch is in the first relation of throw switch, said drive means being energized in a reverse direction when the double-throw switch is actuated to the second relation of throw,
    whereby said material contacting means is repeatedly and automatically raised and lowered by interruptive engagement of the rotating contactor with material contained in the tank.

2. Apparatus of claim 1 further characterized by means for stopping further upward movement of the material contactor whenever said contactor reaches a pre-established upper limit in said tank, and means for stopping further downward movement of said contactor whenever said contactor reaches a pre-established lower limit in said tank.

3. The apparatus of claim 1 further characterized by material level indicating means responsive to the raising and lowering of said material contacting means.

4. The apparatus of claim 1 further characterized by timing means for delaying, for a predetermined period of time, movement of said material contactor in a direction opposite to that in which movement of said contactor is stopped.

References Cited

UNITED STATES PATENTS

| | | | |
|---|---|---|---|
| 2,352,080 | 6/1944 | Crowley et al. | 33—126.6 |
| 2,529,843 | 11/1950 | Kehrer | 33—126 X |
| 2,567,823 | 9/1951 | Needham | 318—482 X |
| 3,094,646 | 6/1963 | Swett | 318—482 X |

FOREIGN PATENTS

| | | |
|---|---|---|
| 376,215 | 5/1923 | Germany. |
| 819,923 | 8/1949 | Germany. |

DAVID SCHONBERG, *Primary Examiner.*

D. M. YASICH, *Assistant Examiner.*